United States Patent
Coors et al.

(10) Patent No.: US 7,255,949 B2
(45) Date of Patent: Aug. 14, 2007

(54) SYSTEMS AND METHODS TO GENERATE HYDROGEN AND ELECTRICAL POWER IN A REVERSIBLE COMPOUND FUEL CELL

(75) Inventors: W. Grover Coors, Golden, CO (US); Roderick W. Sidwell, Littleton, CO (US)

(73) Assignee: Protonetics International, Inc., Golden, CO (US)

( * ) Notice: Subject to any disclaimer, the term of this patent is extended or adjusted under 35 U.S.C. 154(b) by 90 days.

(21) Appl. No.: 11/137,690

(22) Filed: May 24, 2005

(65) Prior Publication Data
US 2005/0271924 A1 Dec. 8, 2005

Related U.S. Application Data

(60) Provisional application No. 60/574,608, filed on May 25, 2004.

(51) Int. Cl.
*H01M 8/04* (2006.01)
*H01M 8/18* (2006.01)
*H01M 8/10* (2006.01)

(52) U.S. Cl. .................... 429/17; 429/19; 429/20; 429/21; 429/33

(58) Field of Classification Search ............. 429/33, 429/20, 21, 19, 17
See application file for complete search history.

(56) References Cited

U.S. PATENT DOCUMENTS

| | | |
|---|---|---|
| 3,544,376 A | 12/1970 | Alessandro et al. |
| 4,130,693 A | 12/1978 | Van Den Berghe et al. |
| 4,810,485 A | 3/1989 | Marianowski et al. |
| 4,851,303 A | 7/1989 | Madou et al. |

(Continued)

FOREIGN PATENT DOCUMENTS

GB    2 206 571    *    1/1989

(Continued)

OTHER PUBLICATIONS

Coors, W.G., Protonic ceramic fuel cells for high-efficiency operation with methane, Journal of Power Sources 2003, 118:150-156.

(Continued)

*Primary Examiner*—Dah-Wei Yuan
*Assistant Examiner*—Thomas H. Parsons
(74) *Attorney, Agent, or Firm*—Townsend and Townsend and Crew LLP

(57) ABSTRACT

A hydrogen and electrical power generating system that includes a hydrogen source to generate a mixture having hydrogen gas, a ceramic fuel cell to generate power from a first portion of the mixture and a hydrogen separator to generate purified hydrogen gas from a second portion of the mixture using a protonic ceramic membrane. Additionally, a hydrogen and electrical power generating system that includes a hydrogen source to generate a mixture having hydrogen gas, and a reversible fuel cell capable of generating electrical power and purified hydrogen gas from the mixture, where the reversible fuel cell has a protonic ceramic electrolyte. Also, a method of generating hydrogen and electrical power that includes generating electric power from a first portion of a hydrogen gas mixture with a protonic ceramic fuel cell, and generating purified hydrogen gas from a second portion of the mixture with a hydrogen separator.

29 Claims, 11 Drawing Sheets

U.S. PATENT DOCUMENTS

| | | | |
|---|---|---|---|
| 4,927,793 A | 5/1990 | Hori et al. | |
| 5,116,696 A | 5/1992 | Barp | |
| 5,387,330 A | 2/1995 | Taniguchi et al. | |
| 5,439,579 A | 8/1995 | Koide et al. | |
| 5,496,655 A | 3/1996 | Lessing | |
| 5,549,983 A | 8/1996 | Yamanis | |
| 5,604,048 A | 2/1997 | Nishihara et al. | |
| 5,616,223 A | 4/1997 | Shen et al. | |
| 5,670,270 A | 9/1997 | Wallin | |
| 5,682,261 A | 10/1997 | Takada et al. | |
| 5,733,435 A * | 3/1998 | Prasad et al. | 205/765 |
| 5,795,502 A | 8/1998 | Terashi et al. | |
| 5,935,398 A | 8/1999 | Taniguchi et al. | |
| 6,033,632 A | 3/2000 | Schwartz et al. | |
| 6,066,307 A | 5/2000 | Keskar et al. | |
| 6,153,163 A | 11/2000 | Prasad | |
| 6,171,574 B1 | 1/2001 | Juda et al. | |
| 6,214,757 B1 | 4/2001 | Schwartz et al. | |
| 6,235,417 B1 | 5/2001 | Wachsman et al. | |
| 6,265,093 B1 | 7/2001 | Surampudi et al. | |
| 6,281,403 B1 | 8/2001 | White et al. | |
| 6,338,833 B1 | 1/2002 | Aasberg-Petersen | |
| 6,811,913 B2 * | 11/2004 | Ruhl | 429/32 |
| 7,011,903 B2 * | 3/2006 | Benson et al. | 429/25 |
| 2002/0006369 A1 | 1/2002 | Buxbaum | |
| 2003/0219637 A1 | 11/2003 | Coors | |
| 2005/0019622 A1 | 1/2005 | Coors | |

FOREIGN PATENT DOCUMENTS

| | | |
|---|---|---|
| GB | 2206571 A | 1/1989 |

OTHER PUBLICATIONS

Kreuer, K.D., Aspects of formation and mobility of protonic charge carriers and the stability of perovskite-type oxides, 1999, 125:285-302.

Virkar et al., Chemical diffusion coefficient of H20 in $AB_{(1-x)}B'_x O_{(3-x/2)}$-type perovskites, Journal of the American Ceramic Society, 2002, 85(12):3059-3064.

* cited by examiner

SYSTEMS AND METHODS TO GENERATE HYDROGEN AND ELECTRICAL POWER IN A REVERSIBLE COMPOUND FUEL CELL

CROSS-REFERENCES TO RELATED APPLICATIONS

This application claims priority to U.S. Provisional App. No. 60/574,608, filed May 25, 2004, and titled "Systems and Methods To Generate Hydrogen and Electrical Power In a Reversible Compound Fuel Cell," the entire contents of which is herein incorporated by reference for all purposes.

BACKGROUND OF THE INVENTION

As costs increase for recovering diminishing supplies of conventional fossil fuels, and evidence mounts about the adverse environmental impact of burning those fuels, developing viable energy alternatives has become a national (and international) priority. One alternative fuel that is receiving considerable attention is hydrogen gas ($H_2$). The byproducts of hydrogen combustion are energy and water, making hydrogen one of the cleanest fuels available for transportation, as well as the generation of electric power. The hydrogen may be harnessed for useful work with conventional power generating systems like steam turbine electric power generating systems and internal combustion engines for motor vehicles, but these systems all suffer from low electrical efficiencies due to the limitations of the Carnot cycle.

Hydrogen becomes more economically competitive with conventional fuels when used in systems with higher efficiencies, such as fuel cells. The costs of electrical power from a fuel cell utilizing hydrogen gas derived from natural gas (e.g., $CH_4$) may be estimated with the following formula:

$$\frac{\text{Cost}}{kWhr} = \frac{\$/Mcf}{V_{cell} \cdot \eta_f \cdot (moles H_2/mole CH_4) \cdot 67.7}$$

Where $/Mcf is the cost of natural gas per 1000 ft$^3$, $V_{cell}$ is the operating voltage of the cell, $\eta_f$ is fuel utilization, and the ratio of $moleH_2/moleCH_4$ is the moles of $H_2$ produced per mole of $CH_4$ used. The factor of 67.7 in the denominator is for units conversion of volts times Mcf to kWhr.

FIG. 1 shows a graph of the cost of electrical power generated by a fuel cell as a function of the price of natural gas. For a natural gas price of $9.5/Mcf, the electrical power generated by the fuel cell is estimated to cost between $0.083/kWhr and $0.074/kWhr for utilization rates of 80% and 99%, respectively. When these costs are restated in terms of price per gallon of gasoline (assuming 70% fuel cell efficiency), the costs range between about $2.40/gal and $1.90/gal, which is very competitive with current gasoline prices, and expected to be more so in the future as gasoline costs continue to rise with rapidly increasing worldwide demand.

Thus, the efficiency gains realizable by hydrogen powered fuel cells can make them competitive with conventional transport and power generation technologies utilizing hydrocarbon based fuels if hydrogen can be manufactured cheaply enough. At the present, the most economical way to make hydrogen is by reforming or partial oxidation of fossil fuels, coal, and hydrocarbons not derived from fossil fuels, such as biofuels.

Building national and international distribution systems for hydrogen is conservatively estimated to take decades and cost hundreds of billions (if not trillions) of dollars. In addition, because hydrogen is much more leak-prone than any gaseous fuel currently in widespread use, unforeseen problems with developing a hydrogen distribution infrastructure will likely increase development times and drive up costs even further. These and other barriers to the widespread adoption of hydrogen for electrical power and vehicle fuel will make a hydrogen economy difficult to implement, even in an environment where conventional fuel costs are rapidly rising. Thus, there is a need for novel methods and systems to make hydrogen widely available without incurring the high costs of developing a hydrogen gas distribution infrastructure. These and other issues are addressed by the present invention.

BRIEF SUMMARY OF THE INVENTION

Embodiments of the invention relate to hydrogen and electrical power generating systems that include a hydrogen source to generate a mixture comprising hydrogen gas. The systems also have a fuel cell to generate power from a first portion of the mixture, and a hydrogen separator to generate purified hydrogen gas from a second portion of the mixture.

Embodiments of the invention also relate to hydrogen and electrical power generating systems that have a hydrogen source to generate a mixture comprising hydrogen gas, and a reversible fuel cell capable of generating electrical power and purified hydrogen gas from the mixture, where the reversible fuel cell comprises a protonic ceramic electrolyte.

Embodiments of the invention still further relate to methods of generating hydrogen and electrical power. The methods may include providing a mixture comprising hydrogen gas, generating electric power from a first portion of the mixture with a ceramic fuel cell, and generating purified hydrogen gas from a second portion of the mixture with a hydrogen separator, and adjusting a percentage of electrical power being generated by adjusting a mole ratio of the first and the second portions of the mixture.

Embodiments of the invention may further relate to a combined hydrogen and electrical power generating system that includes the ability to adjust the ratio of electric power to hydrogen production depending on the instantaneous external power demand. This permits the system to operate at a constant power output level that optimizes its overall efficiency. When more electrical power is required, less hydrogen is produced, and when less electrical power is demanded, say during the nighttime, the surplus electrical power is used to generate and store hydrogen. The stored hydrogen might be used to provide fuel for a vehicle, other appliances, or provide a back-up fuel supply for the system during periods of high electrical power demand. The system may also include a fuel processor for converting primary fuels, such as hydrocarbons, into a mixture of hydrogen, water vapor, carbon monoxide and carbon dioxide, and a method for removing undesired gaseous species, such as sulfur dioxide.

Embodiments of the invention may still further relate to methods of generating hydrogen or electrical power by means of a reversible electrochemical cell, consisting of a protonic ceramic membrane sandwiched between anode and cathode electrodes, called a membrane electrode assembly (MEA). A mixture of hydrogen and other gases, (e.g., unreacted hydrocarbons, water vapor, carbon monoxide and carbon dioxide, etc.), is flowed through a channel in contact with the anode. In fuel cell mode, electrical power is produced by passing oxidant gas (typically air) through a gas channel in contact with the cathode. Electrical power is produced by electrochemically reacting hydrogen with oxygen at the cathode in a fashion typical of all fuel cells. In hydrogen generation mode, hydrogen is produced galvanically in the cathode channel (without oxidant present) by applying a reverse voltage bias between the cathode and anode of the fuel cell and supplying electrical power. A reversible cell element may produce either electrical power or purified hydrogen at one time. When switching a reversible cell from fuel cell mode to hydrogen generation mode, the cathode channel is evacuated, the polarity of the electrodes is reversed and an external load (if present) may be switched to an external power supply.

Embodiments of the invention may still further relate to systems for the cogeneration of electrical power and hydrogen gas. Although single cell elements are reconfigured for either electrical power or hydrogen production, additional embodiments include systems configured as a compound cell, with different cells in series or in parallel. Some system components are used for electrical power generation, while others are configured for hydrogen generation. The electrical power required for galvanic hydrogen generation in some elements is generally provided by other cell elements operating in fuel cell mode, but may also be provided by an external power source. The compound reversible fuel cell system may be adjusted to vary the ratio of hydrogen to electrical power generation from zero to one, depending on the electric power demands from an external load.

Embodiments of the invention may still also relate to systems where an overvoltage applied to the cell elements in hydrogen generation mode is used to pressurize the purified hydrogen gas in the cathode channel. A plurality of the cell elements operating in series may be used to further increase the pressurization and purity of the hydrogen gas. The use of electrolytic pumping to pressurize the hydrogen gas may be used in conjunction with, or in lieu of, conventional mechanical pumping of the gas. The pressurized hydrogen increases the energy capacity of a hydrogen storage unit.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION OF THE INVENTION

The present invention relates to methods and systems that can generate both electrical power and pressurized high-purity hydrogen ($H_2$) gas. Embodiments of the systems are small enough in size to fit in a residential garage or basement, making them practical for home as well as commercial use. The electrical power and hydrogen gas they generate may come from conventional hydrocarbon feedstocks, including any fuels that can be reformed into syngas, such as natural gas (e.g., methane), propane, gasoline, methanol, ethanol, etc., as well as coal and biofuels, which can be delivered to the systems through presently existing fuel distribution infrastructures. Thus, the methods and systems of the present invention can supply electric power and hydrogen to homes, businesses, and vehicles without having to build a new fuel delivery infrastructure. In fact, embodiments of the methods and systems may be designed to operate without the need to connect to grid power, allowing the systems to supply electrical power and hydrogen gas in remote locations.

The systems of the present invention may include hydrocarbon steam reformers, partial oxidation, or combinations of both, to process hydrocarbon feedstocks, ceramic fuel cells to generate electrical power, and hydrogen separators synthesized from protonic ceramic materials that separate hydrogen gas from other gases, such as nitrogen and carbon monoxide. A fuel cell-$H_2$ generating system according to the invention may be affected by many variables, including the conductivity of the electrolyte materials, operating temperature, gas flow rates, heat exchanger efficiency, etc. A system may, for example, produce energy equivalent to 2 gallons of gasoline (i.e., 240 MJ) in a 12 hour period. Since 2 gallons of gasoline has the equivalent energy of about 1000 moles of hydrogen gas (the complete oxidation of 1 mole of $H_2$ produces 242 kJ of energy), the system would generate hydrogen gas at about 31 standard liters per minute (slpm). This would provide enough hydrogen gas to drive 80-160 mile/day in a PEM fuel cell powered car—twice as efficient as a conventional internal combustion engine vehicle getting 20-40 miles/gallon of gasoline.

The hydrogen may be generated by steam reforming of hydrocarbons such as methane, ethane, propane, butane, methanol, ethanol, etc. The steam reforming of methane, for example, can be summarized by the following chemical equation:

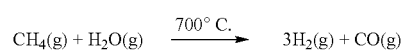

$$CH_4(g) + H_2O(g) \xrightarrow{700°\ C.} 3H_2(g) + CO(g)$$

The hydrogen may also be generated by partial oxidation of the same hydrocarbon fuels. Partial oxidation of methane, for example can be summarized by the following chemical reaction:

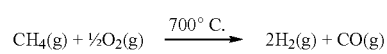

$$CH_4(g) + \tfrac{1}{2}O_2(g) \xrightarrow{700°\ C.} 2H_2(g) + CO(g)$$

Figure 1:
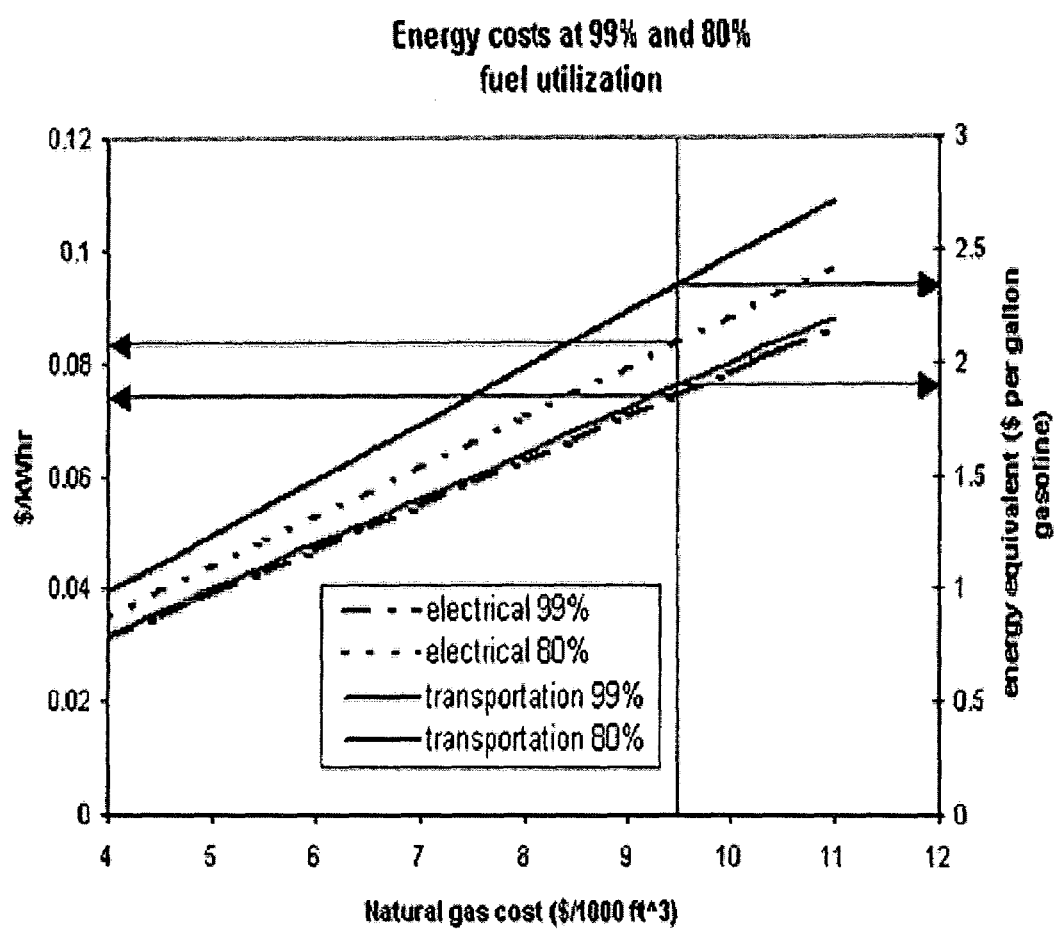
FIG. 1 is a graph plotting energy costs for generating electrical power with a hydrogen fuel cell as a function of natural gas prices.
Figure 2:
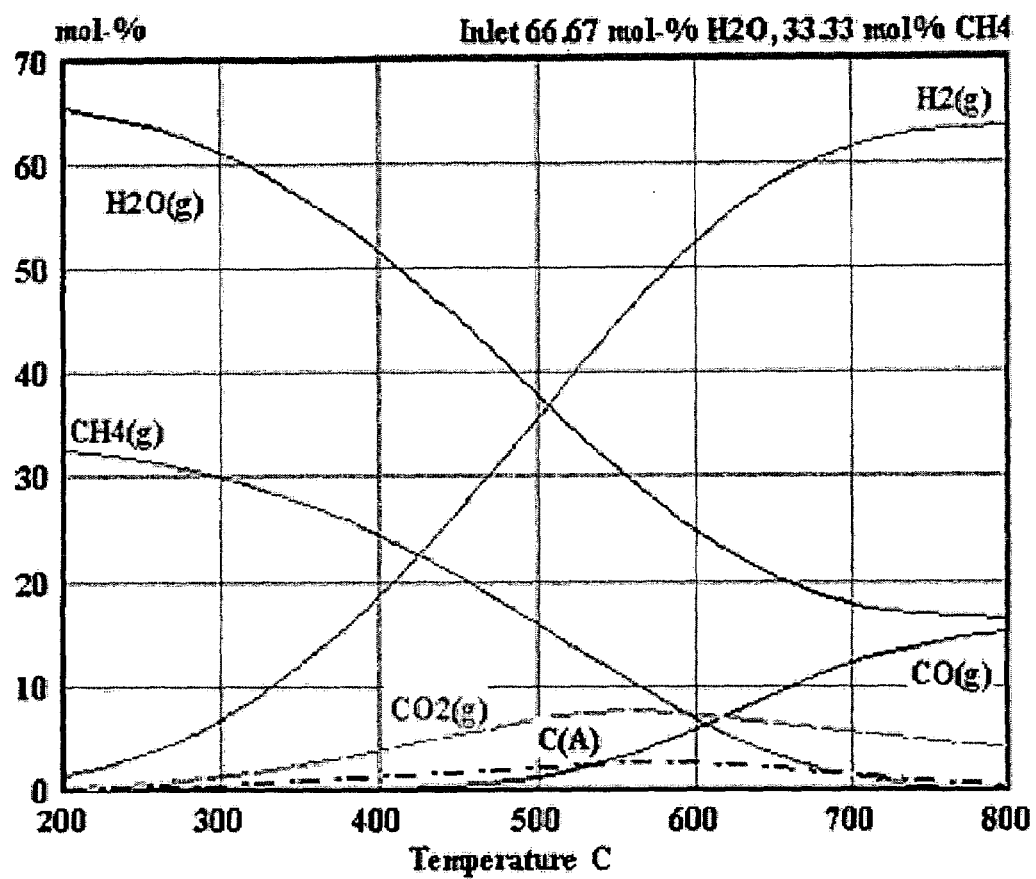
FIG. 2 is a graph of the equilibrium concentrations of reactants and products as a function of temperature for the steam reforming of methane.

Thus, the steam reforming of 1 mole of methane ($CH_4$) yields about 3 moles of hydrogen gas ($H_2$) and one mole of carbon monoxide (CO), and partial oxidation yields about 2 moles of hydrogen gas for each mole of CO generated. FIG. 2 shows a graph of the thermodynamic equilibrium for a mixture of 1 mole of $CH_4$ and 2 moles of $H_2O$. As the graph shows, overall methane conversion increases with temperature, with the mol-% of $H_2$ starting to plateau at around 700° C. The temperature range for active steam reforming (e.g., about 650° C. to about 850° C.) coincides with typical operating temperatures for protonic ceramic fuel cells and hydrogen separators that use a protonic ceramic membrane electrode assembly. Similar plots may be shown for partial oxidation. Processing of hydrocarbon fuels into syngas, consisting primarily of a mixture of hydrogen and carbon dioxide, may occur upstream of the system, internal to the system, or some combination of both.

Exemplary Systems

Figure 3A:
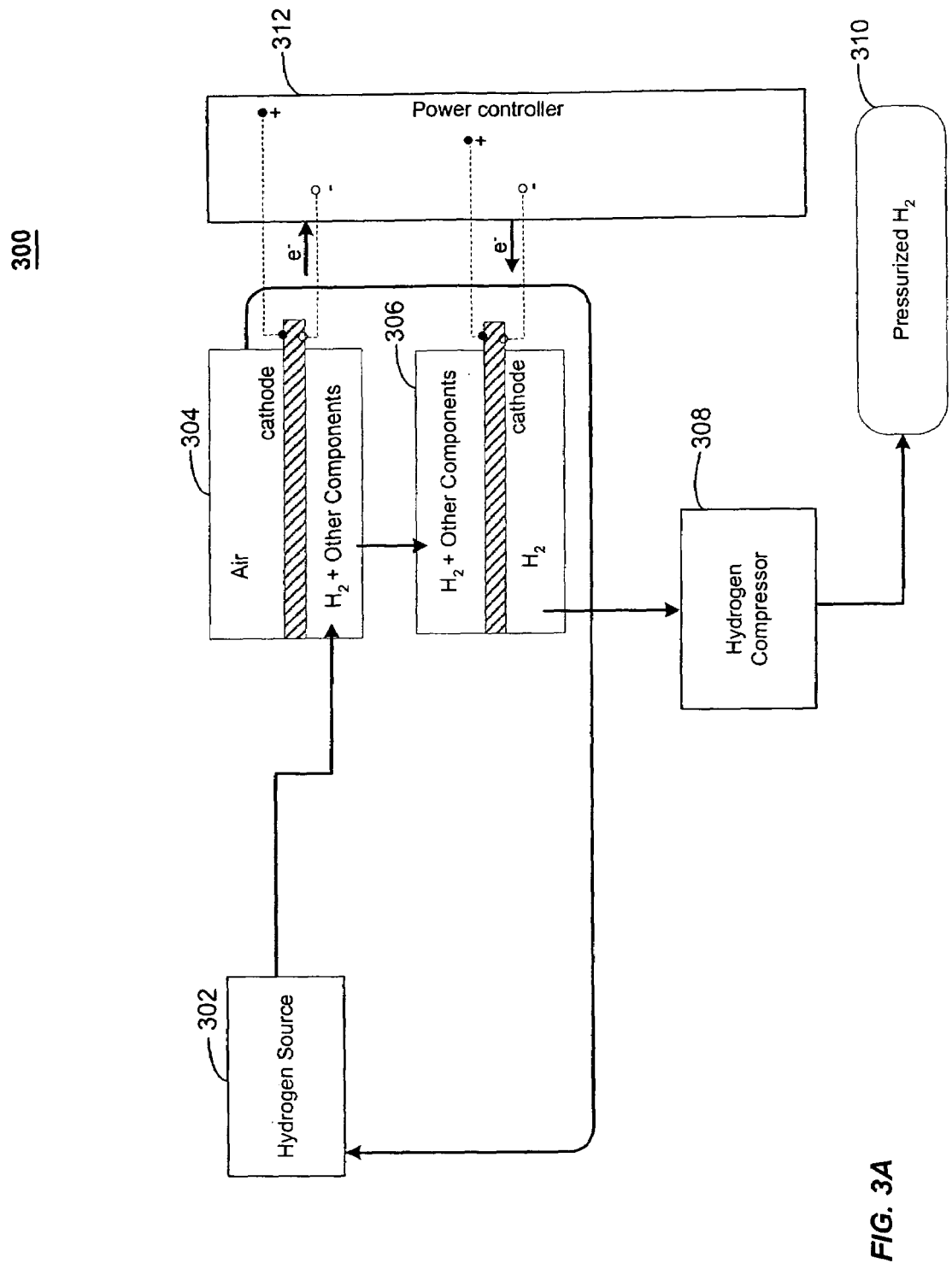
FIGS. 3A-D are schematics of systems for the generation of electrical power and hydrogen gas according to embodiments of the invention.

FIGS. 3A-D show some of many possible realizations of systems for the co-generation of electrical power and hydrogen gas ($H_2$) according to embodiments of the invention. By convention, the electrode where electrons are removed is the anode, and the electrode where electrons are supplied is the cathode. This convention is used throughout the description, regardless of whether the system is producing or consuming electrical power. FIG. 3A shows a system 300 that uses hydrogen gas from a hydrogen source 302. The hydrogen source 302 may include a storage vessel that contains a feedstock mixture containing hydrogen gas. Alternatively (or in addition to the storage vessel) the hydrogen source 302 may also include equipment for generating a mixture that includes hydrogen gas from hydrocarbon starting materials such as methane, ethane, propane, butane, gasoline, methanol, ethanol, coal, etc. Hydrogen gas may be generated from these materials through a variety of processes, including steam reforming, partial oxidation, etc. And the hydrogen source 302 may include equipment for generating hydrogen gas from hydrocarbons using one or more of these processes.

The mixture that includes hydrogen gas provided by hydrogen source 302 is used to generate electrical power in protonic ceramic fuel cell (PCFC) 304, and is also the starting material for the separated and purified hydrogen produced by hydrogen separator 306. In the embodiment shown in FIG. 3A, the fuel cell 304 and hydrogen separator 306 are configured in series, with the mixture from the hydrogen source 302 first flowing through an anode channel of the PCFC 304 before being transported to an anode channel in the hydrogen separator 306. However, the fuel cell 304 and hydrogen generator 306 could equally well operate in parallel, with the same hydrogen source 302 supplied to both anode channels at the same time.

Both the fuel cell 304 and the hydrogen separator 306 may include a protonic ceramic electrolyte sandwiched between anode and cathode electrodes. In the PCFC 304, hydrogen ions (i.e., protons) from the hydrogen gas move through the proton-conducting electrolyte from the anode electrode, to the cathode electrode where they combine with oxygen ions to form water. Electrons involved in the hydrogen oxidation reaction travel between the electrodes through an external circuit, and in the process generate electrical power. In the hydrogen separator 306, hydrogen ions from the hydrogen gas also travel through a protonic ceramic electrolyte membrane, only they do not react with oxygen at the cathode. Instead, electrical current supplied to the electrode circuit causes the hydrogen ions to reform as molecular hydrogen ($H_2$) in the ending electrode channel. Because the protonic ceramic electrolyte favors the migration of hydrogen ions (i.e., protons) over other species (e.g., $N_2$, CO, $CO_2$, etc.) the purified hydrogen gas emerging from the ending electrode channel is separated from the other components of the mixture in the starting electrode channel.

The purified hydrogen gas generated by hydrogen separator 306 may then be introduced to a hydrogen storage unit 310 through a hydrogen compressor 308 that pressurizes the hydrogen in the unit 310. The hydrogen compressor 308 may use electrolytic pumping, conventional mechanical pumping, and/or a combination of both types of pumping to pressurize the hydrogen gas. Electrolytic pumping may involve the creation of a pressure differential for the hydrogen gas on opposite sides of a protonic ceramic membrane. As noted above, a protonic ceramic electrolyte membrane may be used to separate and purify hydrogen gas from other components of a mixture. The flux of the hydrogen ions migrating through the electrolyte membrane is proportional to the electrical current being supplied to the membrane. Application of an overvoltage to the membrane can also create a pressure differential in the hydrogen gas pressure on either side of membrane—the greater the overvoltage, the higher the pressure obtainable for the hydrogen gas.

The hydrogen compressor 308 may also include a conventional, mechanical pump, such as a rotary vane pump, to pressurize the hydrogen gas. These pumps may include an electric motor that actuates a mechanical component, such as a rotatable cylinder, capable of creating a pressure differential between an inlet and outlet side of the pump as the cylinder is being turned. Examples of these types of pumps include the single state hydrogen compressor offered by PCD Machines, Inc. of Warminster, Pa.

The system 300 can generate electrical power and purified hydrogen gas at the same time. A power controller 312 may be used to control the relative outputs of electrical power and purified hydrogen, depending on system utilization. For example, if an external load (not shown) is placing a heavy demand for electrical power on the system 300, then power controller 312 can increase the percentage of hydrogen gas being used for power generation instead of purification and storage. Likewise, if an external source draws a significant amount of purified hydrogen from storage unit 310 (e.g., a hydrogen powered vehicle filling up with hydrogen gas for a trip), then the power controller 312 sensing a drop in hydrogen pressure in the storage unit 310 may increase the percentage of hydrogen gas being purified and stored. The controller 312 may adjust the percentage of hydrogen gas from hydrogen source 302 that gets used for electric power generation between 0% (i.e., system 300 is only producing purified hydrogen) and 100%.

Figure 3B:
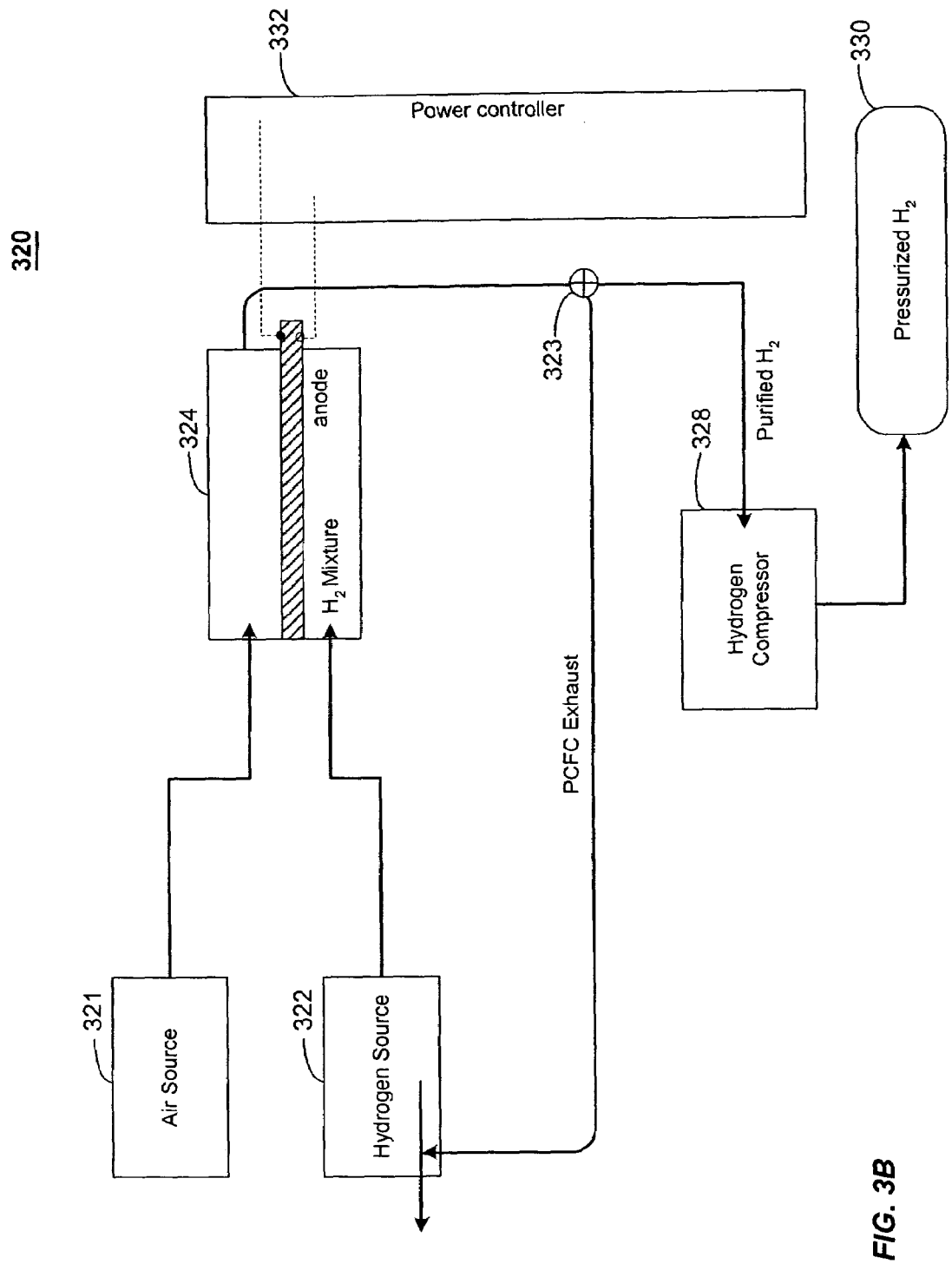

FIG. 3B shows another embodiment of an electrical power and hydrogen gas generating system 320 that includes a single, reversible protonic ceramic fuel cell 324 that can both generate electrical power and purified hydrogen gas. When the system 320 is generating electrical power, an oxidizing gas mixture, such as air supplied by an air source 321, flows through the cathode channel while a mixture that includes hydrogen gas from hydrogen source 322 flow through the anode channel of the PCFC 324. Hydrogen ions from the hydrogen gas migrate through the protonic ceramic electrolyte and combine with oxygen at the cathode while electrons moving through a separate circuit between the anode and cathode electrodes produce electrical power, which may be directed to an external load (not shown) through power controller 332. The hot exhaust gases from the PCFC 324 may be directed by valve 323 back to the hydrogen source 322, where a portion of the heat from the exhaust gases may be captured in a recuperator, or a portion of the exhaust gases may be mixed directly with the incoming fuel stream for generating additional hydrogen gas (e.g., when the hydrogen source includes a hydrocarbon reformer).

When system 320 is producing purified hydrogen gas, the air (or other oxidizing gas mixture) is evacuated from the cathode channel of the PCFC 324. The polarity of the electrode terminals in the PCFC 324 are also reversed from the polarity the terminals have for electrical power generation, and power controller 332 becomes a power source for the PCFC 324. Purified hydrogen gas entering the cathode channel of the PCFC 324 is directed by valve 323 to the hydrogen compressor 328, where the gas may then be compressed into a pressurized hydrogen gas storage unit 330.

Hydrogen compression may also be accomplished by applying an overvoltage to the electrodes of the PCFC 324 when it is operating as a hydrogen separator/purifier. The overvoltage will cause electrolytic pumping and pressurization of the purified hydrogen gas in the anode channel. In some embodiments, the electrolytic pumping capability of PCFC 324 is used in lieu of a separate hydrogen compressor 328 for pressurizing the hydrogen gas in the storage unit 330.

Figure 3C:
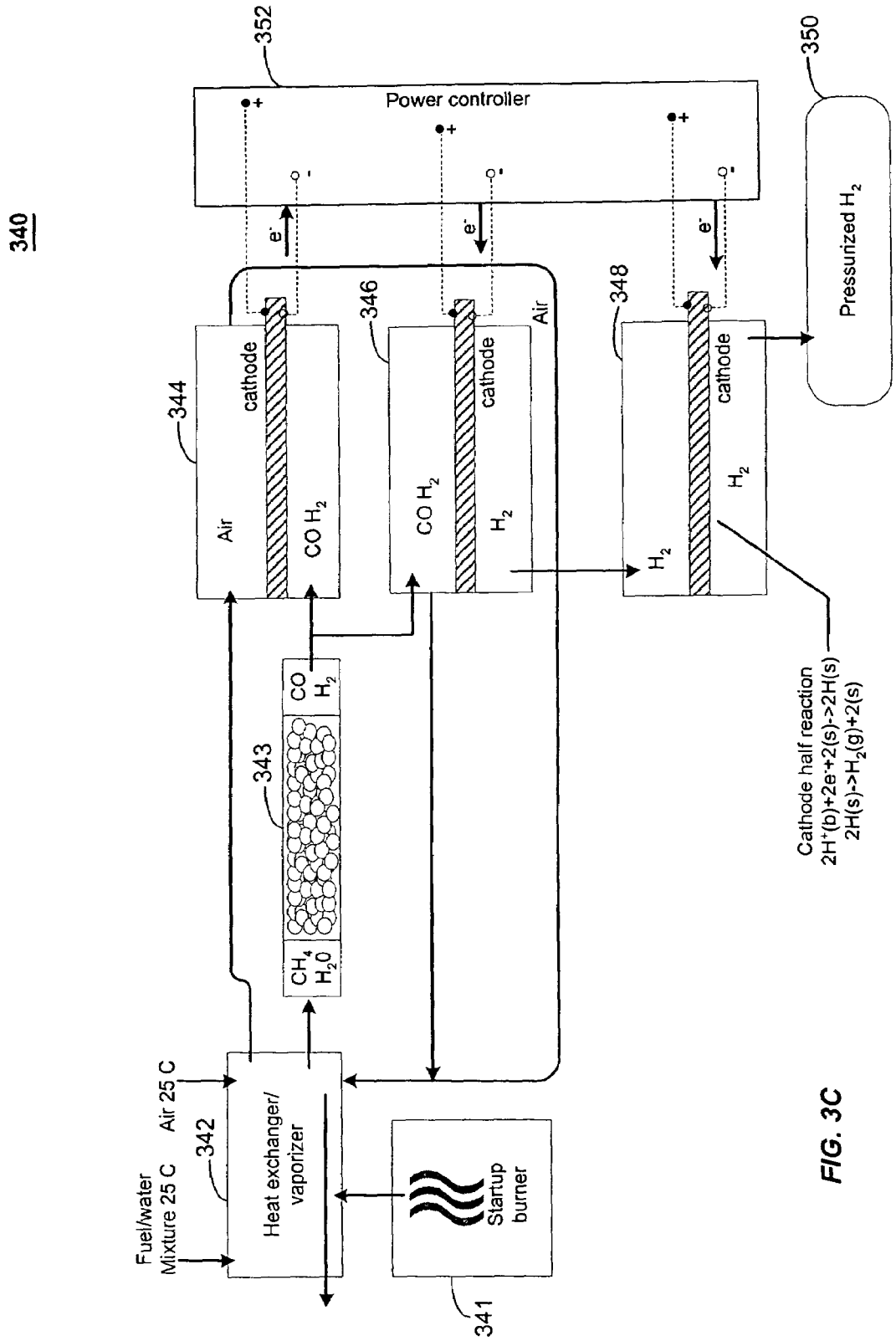

Referring now to FIG. 3C, another embodiment of an electric power and purified hydrogen co-generation system 340 is shown. In system 340, the hydrogen source produces hydrogen gas from the steam reforming of a hydrocarbon fuel. The hydrogen source includes a heater 342 that warms a starting mixture of hydrocarbon fuel and water vapor to a steam reforming temperature (e.g., about 650° C. to about 850° C.). The heater 342 may include a heat exchanger that transfers heat from exhaust gases generated by other components of the system 340 to the fresh fuel and water mixture entering the system. The heater 342 may also be in thermal contact with a startup burner 341 that may supply at least a portion of the energy used to heat the fuel-water mixture in the heater 342. The exhaust gases generated by other components may also be burned in the burner to produce additional heat. The startup burner 341 may be powered, at least in part, by combustion of fresh fuel, combustion of exhaust gases, or electrical power generated external to the system 340.

The heated fuel and water mixture may enter the hydrocarbon reforming unit 343. The reforming unit 343 may include a packed bed of catalyst particles that catalyze the conversion of the hydrocarbon and water into hydrogen gas and carbon monoxide. The selection of the catalyst depends on the fuel being converted in the unit 343. For example, supported nickel metal catalysts may be used for the steam reforming of methane, while $Cu/ZnO/Al_2O_3$ catalysts may be used for methanol reforming.

Steam reforming reactions are typically endothermic: The steam reforming of methane, for example, is endothermic by about 223.8 kJ/mol, at a reformation temperature of 650° C. At least some of the energy needed to drive the reforming reaction may come from exothermic reactions that also occur in the system 340. For example, the hydrogen gas and carbon monoxide generated by the reforming reaction may be oxidized in exothermic reactions that help supply the energy needed for the reforming reaction:

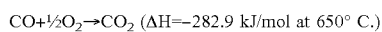

$CO + \tfrac{1}{2}O_2 \rightarrow CO_2$ ($\Delta H = -282.9$ kJ/mol at 650° C.)

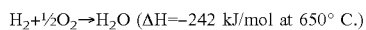

$H_2 + \tfrac{1}{2}O_2 \rightarrow H_2O$ ($\Delta H = -242$ kJ/mol at 650° C.)

In the system 340 shown, protonic ceramic fuel cell (PCFC) 344 and hydrogen separator 346 operate in parallel, each receiving a portion of the reformed mixture of hydrogen gas from the outlet of the reformer 343. During electrical power generation, the hydrogen gas and carbon monoxide generated by the reforming reaction (e.g., syngas) may be transferred to the anode channel of the PCFC 344. The PCFC may include proton conducting electrolyte positioned between an anode and cathode electrode. The electrolyte may be made from a protonic ceramic material, such as a perovskite ceramic, such as a barium-cerium-yttrium oxide ceramic (BCY) having a nominal stoichiometry of $BaCe_{1-x}Y_xO_{2.95+\delta}$, where x may range from about 0.05 to about 0.25, and δ represents the degree of protonation with a value ranging from 0 to x/2. The electrolyte may also be made from a perovskite ceramic such as barium-zirconium-yttrium oxide (BZY) having a nominal stoichiometry of $BaZr_{1-x}Y_xO_{2.95+\delta}$, where x and δ have the same range of values as for BCY. The electrolyte material may also be a solid solution or composite of BCY and BZY. Other protonic ceramics may be fabricated by substituting different cations on the perovskite $ABO_3$ lattice with suitable dopants. Additional details about the electrodes and electrolytes for PCFCs are described in U.S. patent application Ser. No. 10/353,215, (now U.S. Pat. No. 7,045,231), by Coors, and titled "Direct Hydrocarbon Reforming in Protonic Ceramic Fuel Cells by Electrolyte Steam Permeation," the entire contents of which is herein incorporated by reference for all purposes.

In the cell elements operating in electrical power generation mode (electrolytic mode), hydrogen ions may be transported across the proton-conducting electrolyte membrane, due the electrochemical potential gradient imposed by the Nernst potential, and react with the oxygen present in the cathode channel to form $H_2O$. The anode half-reactions may be represented by:

$H_2 \rightarrow 2H_{ads}$

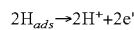

$2H_{ads} \rightarrow 2H^+ + 2e'$ and the cathode half-reactions are:

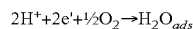

$2H^+ + 2e' + \tfrac{1}{2}O_2 \rightarrow H_2O_{ads}$

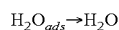

$H_2O_{ads} \rightarrow H_2O$

In the cell elements operating in hydrogen generation mode (galvanic mode), hydrogen ions may be transported (or pumped) across the proton-conducting membrane, due to the electrochemical potential imposed by an applied voltage. The hydrogen separator removes hydrogen gas from the gas mixture in the anode channel according to the half-reactions:

$H_2 \rightarrow 2H_{ads}$

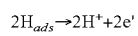

$2H_{ads} \rightarrow 2H^+ + 2e'$ and delivers purified hydrogen into the cathode channel according to the half-reactions:

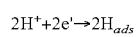

$2H^+ + 2e' \rightarrow 2H_{ads}$

$2H_{ads} \rightarrow H_2$

The half reactions shown above imply 100% Faradaic efficiency. That is, one hydrogen molecule is transported across the membrane for every two electrons delivered by the external power source. High Faradaic efficiency has been confirmed by laboratory experiment. For example, if one mole of hydrogen gas uses 192,970 Coulombs, then 1000 moles of $H_2$ over a 12-hour period uses a mean current of 4467 amps. A voltage of several hundred mV is sufficient to transport the $H_2$ across the protonic ceramic separation membrane of the hydrogen generation element 346. Some residual hydrogen along with unreacted hydrocarbon species and carbon monoxide may provide a fuel source for other fuel cell elements in the system, or be used as a supplemental heat source if burned directly.

The hydrogen separator 346 may include a membrane electrode assembly (MEA) made of protonic ceramic materials. Protonic ceramic materials may include any ceramic materials that have a proton transference number greater than about 0.5 when the material is heated to a temperature of about 500° C. or more. The materials and construction may be the same as those in the MEAs used for electrical power generation elements (e.g., PCFCs), or different materials may be used. Examples of the protonic ceramic materials may include barium cerate ceramic, such as $BaCeO_3$ doped with 10 mol. % yttrium and barium zirconate ceramic doped with 20 mol % yittrium, or combinations of the two. The MEA may be a disc shaped ceramic membrane with a coating of silver metal (Ag) used for the cathode, and platinum (Pt) used for the anode. In one embodiment, the membrane may have a thickness of about 0.4 mm and a diameter of about 1.12 cm. In a further embodiment, the MEA may be in the form of a tube with a thin membrane of dense protonic ceramic, with a thickness of about 25 microns, applied to a catalyst support. The rate at which the hydrogen passes through the membrane may be controlled by the voltage applied between the electrodes of the MEA.

In the embodiment illustrated in FIG. 3C, a second membrane 348 capable of compressing the hydrogen gas separated by hydrogen separator 346 may also be included in the system 300. The membrane 348 may increase the outlet pressure of the purified hydrogen gas above that for a single membrane system configuration. One or more additional membranes 348 may be connected in series to boost the pressure and increase the purity of the hydrogen in multiple stages. The membrane 348 may also help mitigate the effects of CO surface coverage that can limit the pressure ratio of a single membrane system.

The system 340 may also include equipment for compressing and storing the purified hydrogen gas produced by the hydrogen separators 348. For example purified hydrogen gas generated by hydrogen separator 346 and compressed by membrane 348 may be stored in gas storage unit 350. The gas storage unit 350 may be constructed to store the purified hydrogen gas at pressures as high as 5000 psi or more. At these compression levels the stored hydrogen can be directly transferred to a hydrogen powered vehicle, which typically uses compressed hydrogen. The gas storage unit 350 may also include a pressure meter (not shown) that indicates the current pressure of hydrogen gas stored in the unit.

In some embodiments, electrolytic compression with membrane 348 may be the exclusive mode of compressing hydrogen gas. Electrolytic compression is generally more efficient than conventional mechanical compression, and may be more suited to sources of low-voltage and high-current electrical power, like the power supplied by the PCFC component of system 340. This may reduce or eliminate the need for a separate, external high-current power supply to power a hydrogen compression unit.

Alternatively, embodiments of the invention may include other compression equipment (not shown) in addition to (or in lieu of) the membrane 348 that is used to compress the hydrogen gas in storage unit 350. The compression equipment may include conventional hydrogen gas mechanical compressors. In mechanical compression, an electric motor provides energy to compress the hydrogen gas. For isothermal compression up to 5000 psi (340 atm) in storage unit 350, the work needed to pressurize on mole of $H_2$ is:

$$W = \int_{P_1}^{P_2} PdV = nRT\ln\left(\frac{V_2}{V_1}\right) = 14.4 \text{ kJ}$$

Where W represents work in Joules, P is pressure in Pa, n is the number of moles, R is the gas constant, T=298 K, and V is volume. A 1 slpm flow requires 10.7 watts of electrical power (T=298K, and P=340 atm, final pressure). For a conventional hydrogen compressor, such as those manufactured by PDC Machines, Inc., hydrogen may be compressed at a rate of 1.92 $Nm^3$/hr. Using the compression equation above, (with P=340 atm, and a 1 $Nm^3$/hr flow rate being equivalent to 44.6 moles/hr) the compressor should consume about 179 watts.

Embodiments of the system may be designed to continuously co-generate electrical power and hydrogen gas, while varying the ratio of electric power to hydrogen production depending on demand. Power controller 352 can adjust the portions of the hydrogen gas used for electrical power generation versus separation and storage in storage unit 350. For example, when an external device is drawing a lot of electrical power from system 340, the power controller 352 can adjust the electrode voltage of the hydrogen separator 346 to favor the consumption of $H_2$ for electrical power generation over separation and storage. When the level of electric power being pulled by the external device is reduced, the power controller 352 may then adjust the electrode voltages again to direct a larger portion of the $H_2$ gas in the reform mixture to be separated and stored in storage unit 350. The power controller 352 may also control the power generation of PCFC 344 by controlling the PCFC electrode voltage. In addition, the power controller 352 may be used to adjust both the flow rate and compression level of the $H_2$ gas that is being separated and stored in storage unit 350. For example, the power controller 352 may adjust the electrode voltage of membrane 348 to control the compression level of $H_2$ gas on opposite sides of the compression membrane 348.

Figure 3D:
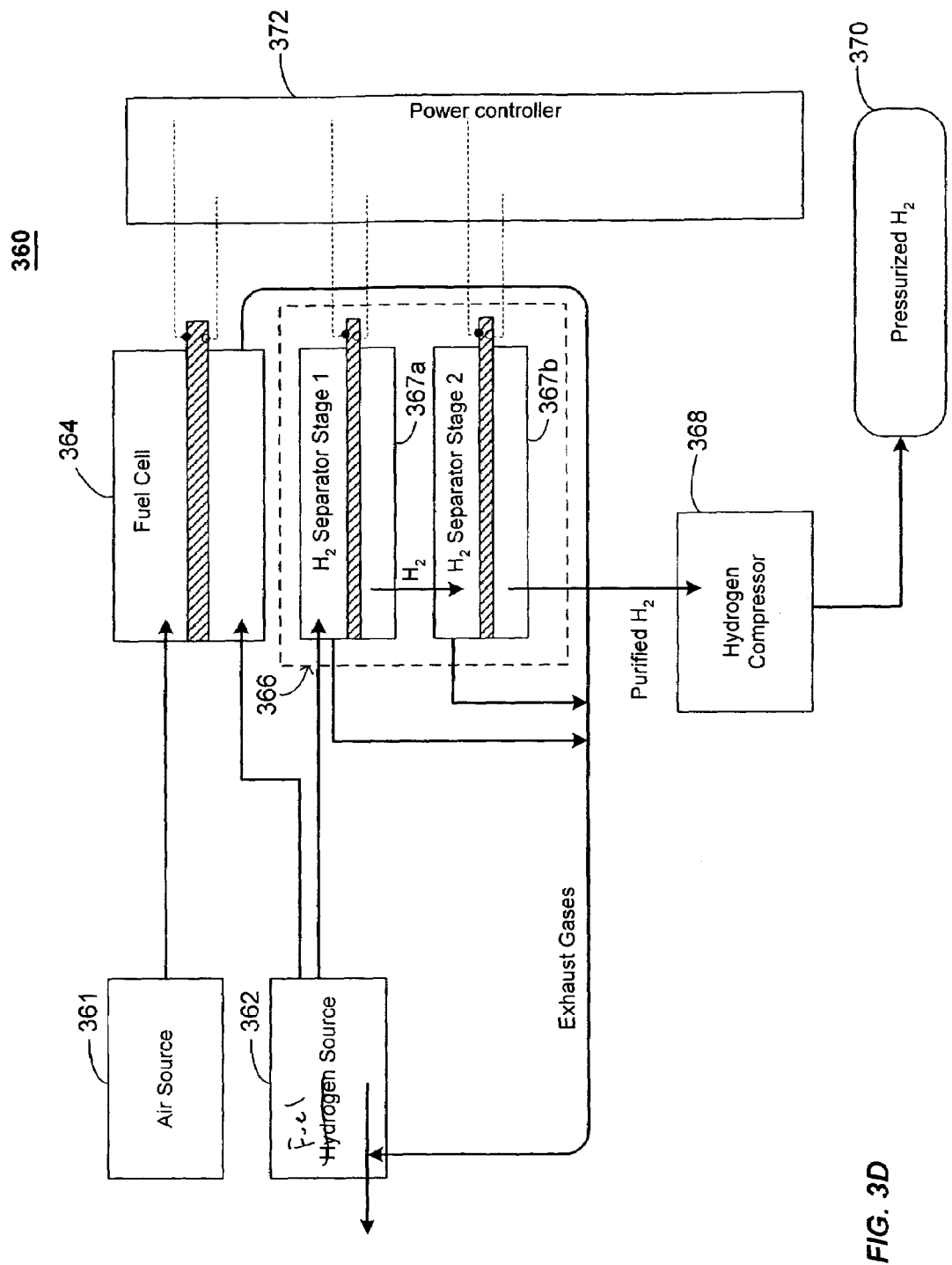

Referring now to FIG. 3D, a system 360 according to an embodiment of the invention is shown where the fuel cell 364 used to generate electrical power may be either a PCFC or a solid oxide fuel cell (SOFC), and the multi-stage hydrogen separator 366 includes a first stage hydrogen separator 367a, and a second stage hydrogen separator 367b. The system 360 includes an air source 361 and fuel source 362 that supply the oxygen and hydrogen gases to the air and fuel channels of fuel cell 364. If the fuel cell 364 is an SOFC with an oxygen ion conducting ceramic electrolyte, the fuel source may include hydrogen, carbon monoxide, etc. The oxygen ions migrating across the electrolyte combine with hydrogen and/or carbon monoxide at the anode electrode while the electrons traveling between the electrodes pass through power controller 372 and generate electrical power.

The fuel source 362, which generates a fuel mixture that includes hydrogen gas, may also be connected to the first stage 367a of the hydrogen separator 366. In first stage 367a, hydrogen ions from the hydrogen gas in the fuel mixture migrate through a first membrane electrode assembly (MEA) made of protonic ceramic material. The purified hydrogen emerging from the first stage is then sent to the second stage 367b of the hydrogen separator 366 where the hydrogen gas may be further purified and/or pressurized by a second MEA before being sent to hydrogen compressor 368 and hydrogen storage unit 370. In alternate embodiments (not shown) the multi-stage separator 366 may pressurize the hydrogen to the point where a separate compressor 368 is not required, and the purified and pressurized hydrogen is sent directly to the hydrogen storage unit 370. Additional embodiments of a multi-stage hydrogen separator (not shown) are also contemplated that include three, four, five, or more separate MEA stages that sequentially purify and/or pressurize the hydrogen gas from a hydrogen source.

Exemplary Method

Figure 4:
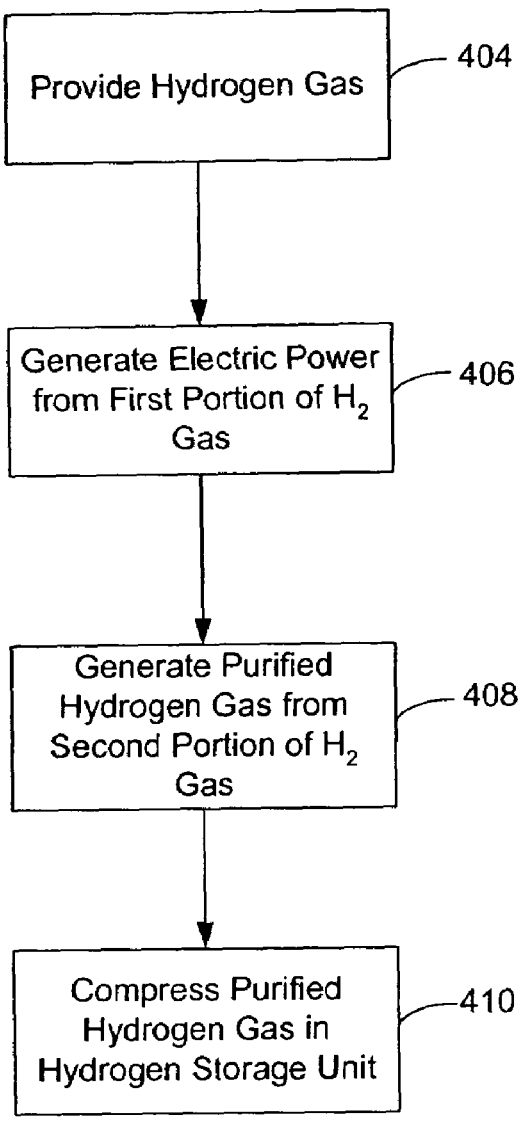
FIG. 4 is a flowchart illustrating methods of generating hydrogen and electric power according to embodiments of the invention.

Turning now to FIG. 4, a flowchart for a method 400 of generating hydrogen and electrical power according to embodiments of the invention is shown. The method 400 includes providing hydrogen gas 404 for the electric power and purified hydrogen gas generation. The hydrogen gas may be provided by generating a mixture that includes the hydrogen gas by steam reforming of a hydrocarbon fuel. A steam reforming process includes heating a fuel and water mixture to a reforming temperature (e.g., about 600° C. to about 850° C.), where the starting materials can undergo a reforming reaction. The energy need to raise the fuel and water mixture to the reforming temperature may be supplied, at least in part, by a startup burner that uses fuel combustion or electrical power to heat the mixture. At least some of the energy to heat the fuel and water mixture may also be supplied by hot gases exiting fuel cells which are in fluid communication with a heat exchanger that transfers heat from the hot gases to the ambient temperature fuel and water mixture.

The heated fuel and water mixture may be reformed into a reformed mixture that includes hydrogen gas ($H_2$) and carbon monoxide (CO). The reforming may take place in the presence of a reforming catalyst that facilitates the conversion of the fuel and water mixture to the reformed mixture.

The hydrogen gas in the reformed mixture may include a first portion that is used to generate electrical power 406, and a second portion that is separated and purified from the reformed mixture 408. The separated and purified portion of the hydrogen gas may then be compressed 410 for more concentrated storage.

The ratio of hydrogen gas in the first and second portions may be adjusted during co-generation operation in response to the current demand for electrical power. For example, when the immediate demand for electrical power increases, the first portion of hydrogen gas may be increased relative to the second portion so that more electrical power is available for the increased demand. The ratio of the first and second portions of hydrogen gas may also be adjusted in response to changes in to the pressure levels of stored hydrogen gas. For example, when the pressure of the stored hydrogen gas decreases, the second portion of hydrogen gas that is separated and purified may increase relative to the first portion.

EXPERIMENTAL

Figure 5:
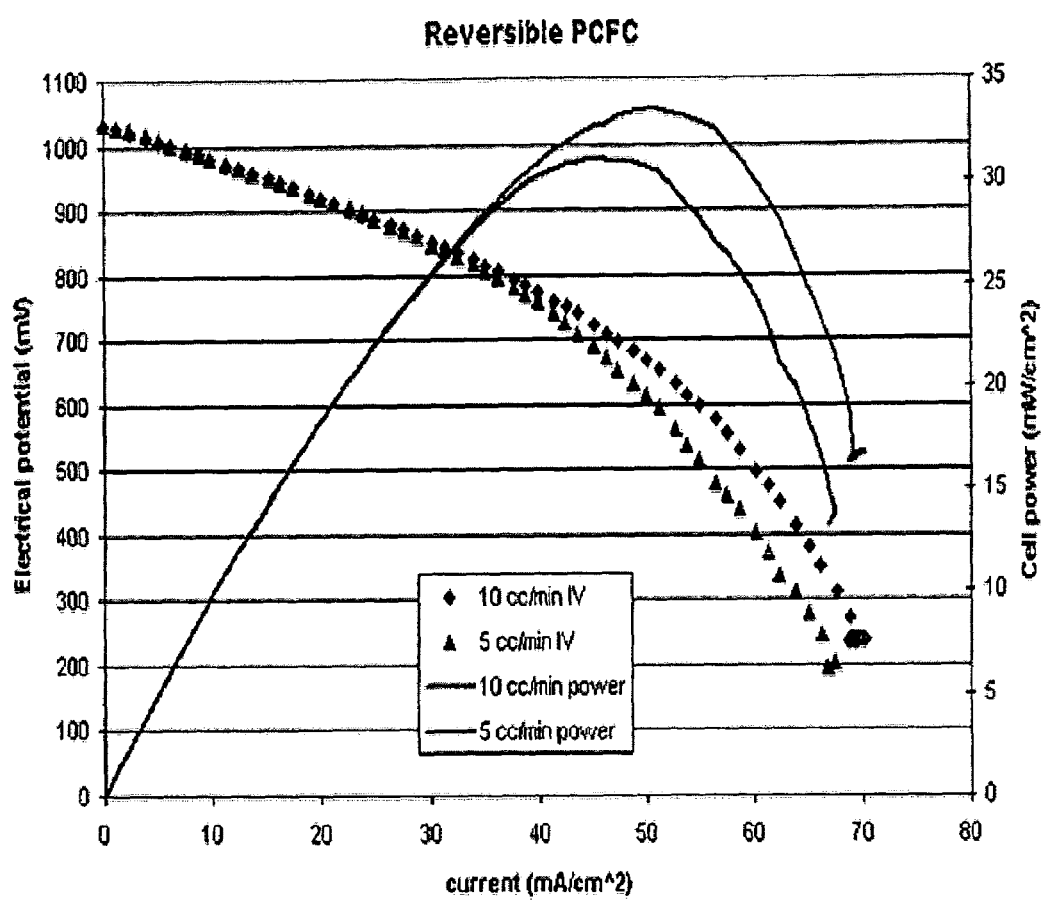
FIG. 5 shows a plot of electrical potential versus current for a reversible protonic ceramic fuel cell, PCFC, operating on $H_2$ at 650° C. in electrical power generation mode.

FIG. 5 is a graph showing the Current-Voltage ("IV") and power measurements from a protonic ceramic fuel cell operating at 650° C. Power and IV measurements from the PCFC are taken for two inlet flow rates of hydrogen gas in the anode channel of the fuel cell: 5 cc/min and 10 cc/min. One standard cc per minute is equivalent to one sccm. Air flow through the cathode channel is maintained at 10 sccm for both inlet flow rates to the anode channel. The top curve in FIG. 5 shows the IV and power measurements when $H_2$ flows at 5 sccm into the anode channel, and the lower curve shows the results for measurements at a 10 sccm flow rate. In both sets of measurements, the temperature of the PCFC is maintained at 650° C. The data show that Faradic efficiencies of about 100% can be expected. At 100% Faradic efficiency, the generation of 1 mole of $H_2$ requires 192,970 C of electrons. In other words, 1 Amp would produce about 5.18 µmoles/second, or 25,483 amp-hours is needed to produce the hydrogen energy equivalent of 1 gallon of gasoline. At 1 Volt, a 5 kW reversible PCFC compound fuel cell system according to embodiments of the invention could produce the energy of 2 gallons of gasoline in about 12 hours.

Figure 6:
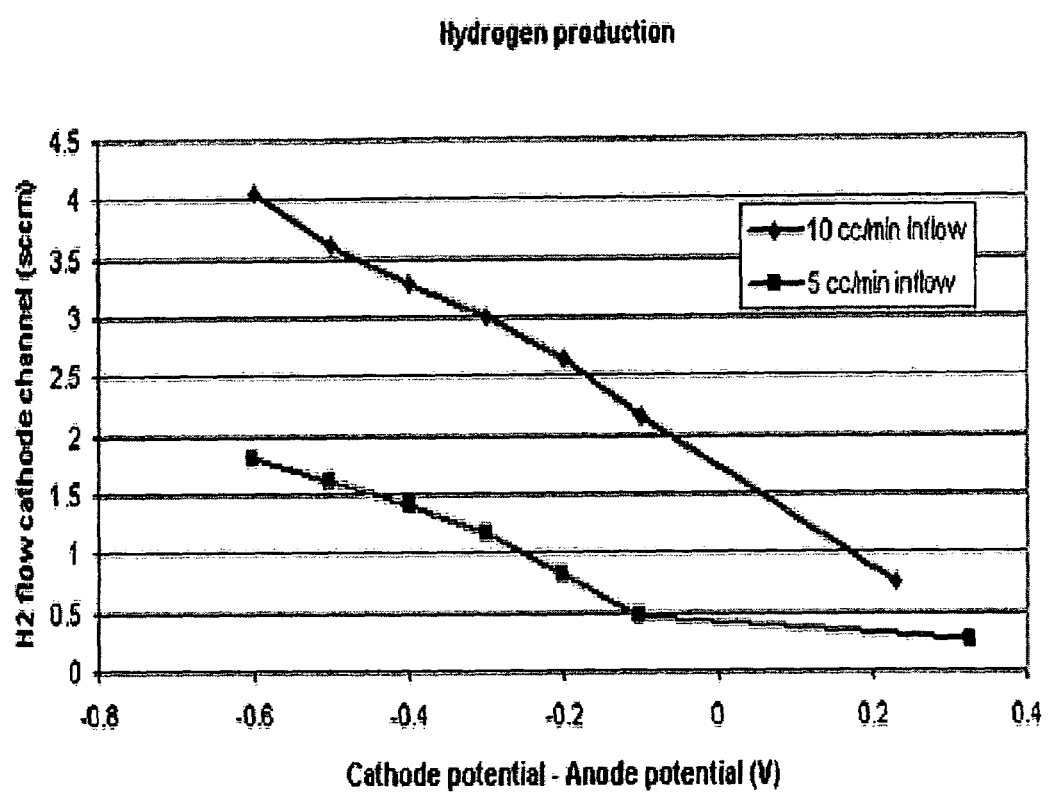
FIG. 6 shows a plot of $H_2$ flow rate versus applied voltage for a reversible PCFC operating in hydrogen generations mode.

FIG. 6 is a graph showing the hydrogen production as a function of anode potential (in volts) for a reversible PCFC having a BCY membrane electrode assembly with a 4 cm² active area. Significant quantities of hydrogen are transported from the anode gas channel to the cathode gas channel of the fuel cell. Voltages of several hundred millivolts may be applied to the electrodes to transport the hydrogen across the MEA. As FIG. 6 shows, transport of hydrogen across the electrolytic membrane increases substantially linearly as the cathode is made more negative. The transport and separation of hydrogen from the anode channel of the PCFC may be modeled with the Nernst equation:

$$E_r = \frac{RT}{2F} \ln\left(\frac{P_{H_2}(\text{anode})}{P_{H_2}(\text{cathode})}\right)$$

Calculations with the above equation show that the membrane can generate relatively high pressures for separated and purified $H_2$. For example, when the hydrogen pressure in the cathode is higher than that of the anode, at a fuel cell operating temperature of 650° C. the first term of the Nernst equation (RT/2F) is 0.04. Propagating this through for a hydrogen pressure in the cathode channel that is 1000 time the pressure in the anode channel, the calculated reversible voltage necessary to maintain this pressure difference in the operating fuel cell is −274 mV. This means the membrane electrode assembly may be used to compress the separated $H_2$ gas as well.

Figure 7:
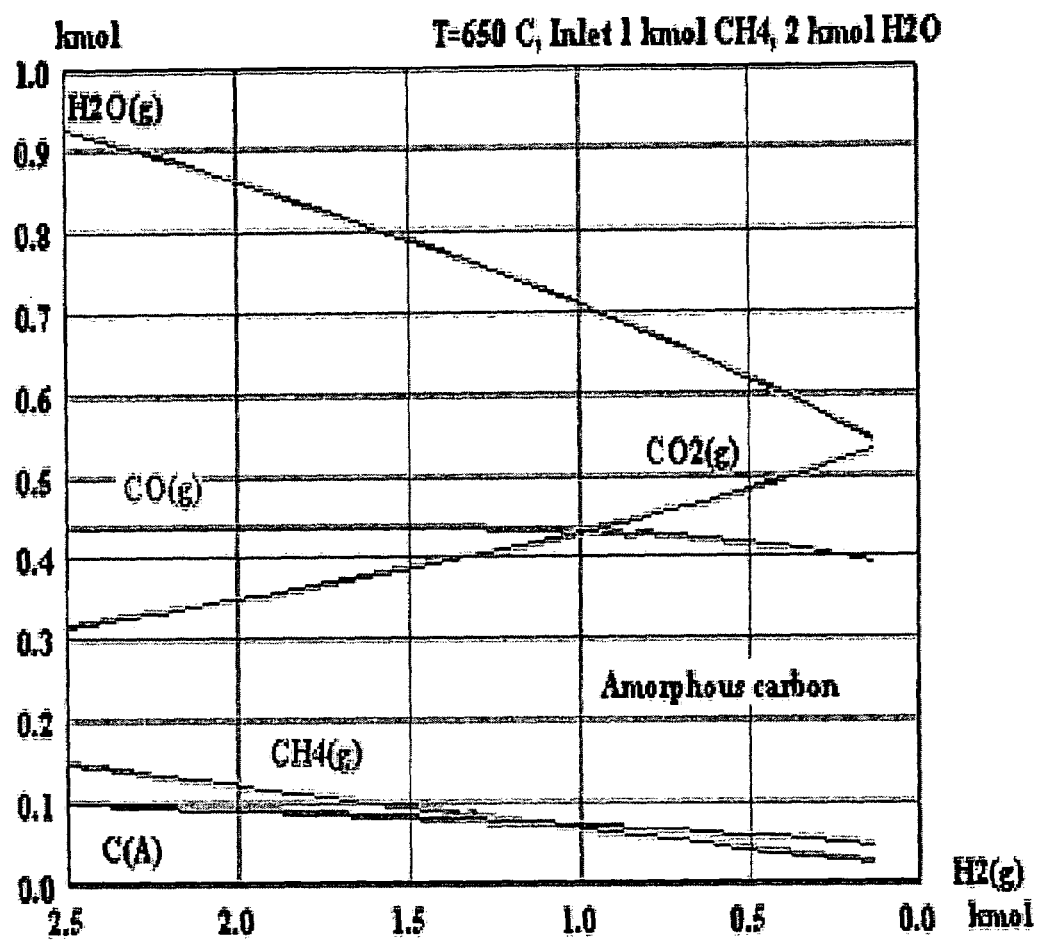
FIG. 7 shows a plot of equilibrium concentrations for a reforming reaction in the presence of amorphous carbon.
Figure 8:
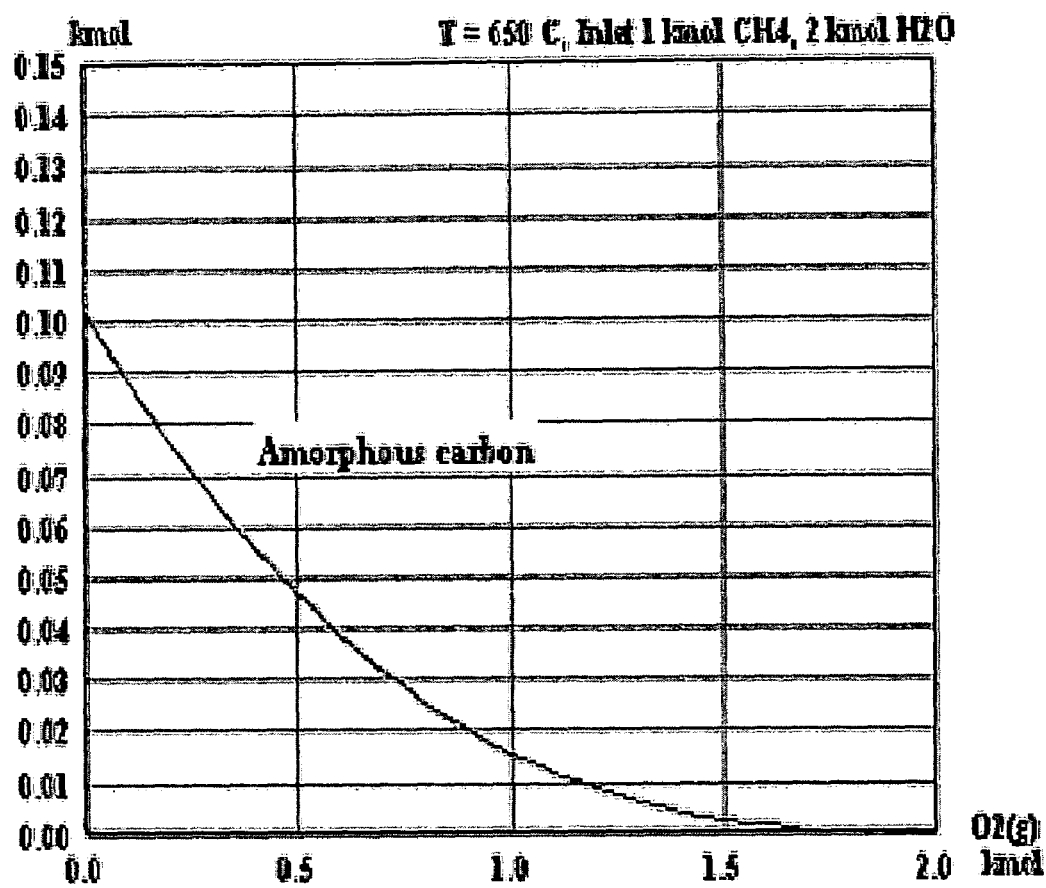
FIG. 8 shows equilibrium concentrations of amorphous carbon as a function of increasing oxygen concentration.

The formation of amorphous carbon on the electrodes of the PCFCs in systems of the present invention is also investigated. The amorphous carbon (i.e. coke) is removed in PCFC sections according to equilibrium chemistry. Removal of $H_2$ reduces the amount of $H_2O$ present and favorably affects the equilibrium amount of coke that forms. FIG. 7 shows the equilibrium for an initial mixture of 3 kmol $H_2$, 1 kmol $H_2O$, and 1 kmol CO. Removal of $H_2$ in both the PCFC and electro-separation process helps prevent coke formation. FIG. 8 shows the equilibrium concentration level of amorphous carbon for an inlet mixture of 1 mole $CH_4$ and 2 moles $H_2O$. The x-axis shows the amount of a $O_2$ added. For both the PCFC fuel cell component and the hydrogen separator of the system, the presence of additional $H_2O$ should aid in the overall prevention of coke formation.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a," "an," and "the" include plural referents unless the context clearly dictates otherwise. Thus, for example, reference to "a process" includes a plurality of such processes and reference to "the electrode" includes reference to one or more electrodes and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A hydrogen and electrical power generating system comprising:
   a hydrogen source to generate a mixture comprising hydrogen gas;
   a fuel cell to generate power from a first portion of the mixture; and
   a hydrogen separator to generate purified hydrogen gas from a second portion of the mixture, wherein the hydrogen separator comprises a protonic ceramic membrane that permits hydrogen ions to migrate through the membrane.

2. The hydrogen and electrical power generating system of claim 1, wherein the fuel cell is a protonic ceramic fuel cell (PCFC).

3. The hydrogen and electrical power generating system of claim 1, wherein the fuel cell is a solid oxide fuel cell (SOFC).

4. The hydrogen and electrical power generating system of claim 1, wherein the hydrocarbon source generates hydrogen gas from one or more hydrocarbon fuels selected from the group consisting of methane, ethane, propane, butane, ethanol, and methanol.

5. The hydrogen and electrical power generating system of claim 1, wherein the hydrogen source comprises a fuel reforming system, which includes:
   a heater to raise a hydrocarbon fuel and water mixture to a fuel reforming temperature; and
   a hydrocarbon reforming unit to convert the hydrocarbon fuel and water mixture into the mixture comprising hydrogen gas, wherein the mixture also comprises carbon monoxide.

6. The hydrogen and electrical power generating system of claim 1, wherein the hydrogen source comprises a partial fuel oxidation system that oxidizes a hydrocarbon fuel into a product mixture comprising hydrogen gas and carbon monoxide.

7. The hydrogen and electrical power generating system of claim 1, wherein the hydrogen source comprises an autothermal reforming system.

8. The hydrogen and electrical power generating system of claim 1, wherein the protonic ceramic membrane has a proton transference number of about 0.5 or more when operating at a temperature of about 500° C. or more.

9. The hydrogen and electrical power generating system of claim 1, wherein the protonic ceramic membrane comprises yttria doped $BaCeO_3$.

10. The hydrogen and electrical power generating system of claim 1, wherein the migration rate of the hydrogen ions through the protonic ceramic membrane is controlled by adjusting a voltage applied to the membrane.

11. The hydrogen and electrical power generating system of claim 1, wherein the hydrogen separator comprises two or more hydrogen separator stages, each of which includes a protonic ceramic membrane.

12. The hydrogen and electrical power generating system of claim 1, wherein the system comprises a compressor to pressurize the purified hydrogen gas from the hydrogen separator.

13. The hydrogen and electrical power generating system of claim 12, wherein the compressor comprises an electrolytic pumping unit that has a membrane electrode assembly which includes an additional protonic ceramic membrane.

14. The hydrogen and electrical power generating system of claim 13, wherein the electrolytic pumping unit controls the purified hydrogen gas pressure by adjusting the voltage across the additional protonic ceramic membrane.

15. The hydrogen and electrical power generating system of claim 12, wherein the compressor comprises a mechanical compressor.

16. The hydrogen and electrical power generating system of claim 1, wherein the system comprises a hydrogen gas storage unit to store the purified hydrogen gas.

17. The hydrogen and electrical power generating system of claim 1, wherein the system comprises a controller to adjust a ratio of the first and second portions of the mixture being supplied to the protonic ceramic fuel cell and the hydrogen separator.

18. The hydrogen and electrical power generating system of claim 17, wherein the system comprises an outlet to transfer at least a portion of the electrical power generated by the protonic ceramic fuel cell to an external device.

19. The hydrogen and electrical power generating system of claim 18, wherein the controller adjusts the mixture ratio using pressure data for the purified hydrogen stored in a hydrogen storage unit, and power usage data from the electrical power transferred to the external device.

20. A hydrogen and electrical power generating system comprising:
   a hydrogen source to generate a mixture comprising hydrogen gas; and
   a reversible fuel cell capable of generating electrical power and purified hydrogen gas from the mixture, wherein the reversible fuel cell comprises a protonic ceramic electrolyte.

21. The hydrogen and electrical power generating system of claim 20, wherein the protonic ceramic electrolyte is between a cathode and an anode, and the electrical power is generated when the mixture comprising hydrogen gas contacts the anode, and an oxidant mixture comprising oxygen gas contacts the cathode.

22. The hydrogen and electrical power generating system of claim 20, wherein the protonic ceramic electrolyte is between a cathode and an anode, and wherein the purified hydrogen gas is generated galvanically at the cathode by applying a reverse voltage bias between the cathode and the anode.

23. The hydrogen and electrical power generating system of claim 20, wherein the protonic ceramic electrolyte comprises yttria doped $BaCeO_3$.

24. The hydrogen and electrical power generating system of claim 20, wherein the protonic ceramic electrolyte comprises yttria doped $BaZrO_3$.

25. The hydrogen and electrical power generating system of claim 20, wherein the system comprises:
 a compressor to pressurize the purified hydrogen gas generated by reversible fuel cell; and
 a storage unit to store the purified hydrogen gas.

26. A method of generating hydrogen and electrical power, the method comprising:
 providing a mixture comprising hydrogen gas;
 generating electric power from a first portion of the mixture with a protonic ceramic fuel cell, and generating purified hydrogen gas from a second portion of the mixture with a hydrogen separator, wherein the hydrogen separator comprises a protonic cermic membrane that permits hydrogen ions to migtate through the membrane; and
 adjusting a percentage of electrical power being generated by adjusting a mole ratio of the hydrogen consumed in the first and the second portions of the mixture.

27. The method of generating hydrogen and electrical power according to claim 26, wherein the percentage of electrical power generated has a range between 0 and 100%.

28. The method of generating hydrogen and electrical power according to claim 26, wherein the percentage of electrical power generated depends on electric power requirements of an external load that is drawing power from the protonic ceramic fuel cell.

29. A method of generating hydrogen and electrical power with a reversible fuel cell, the method comprising:
 providing a mixture comprising hydrogen gas;
 generating electric power from a first portion of the mixture with the reversible fuel cell, and generating purified hydrogen gas from a second portion of the mixture with the same reversible fuel cell, wherein the reversible fuel cell comprises a protonic ceramic electrolyte.

* * * * *